Feb. 2, 1965  R. E. SPOKES ETAL  3,168,487
FRICTION COMPOSITION OF A RUBBER, CASHEW NUT
SHELL RESIN AND LEAD SULPHIDE
Filed Nov. 20, 1959
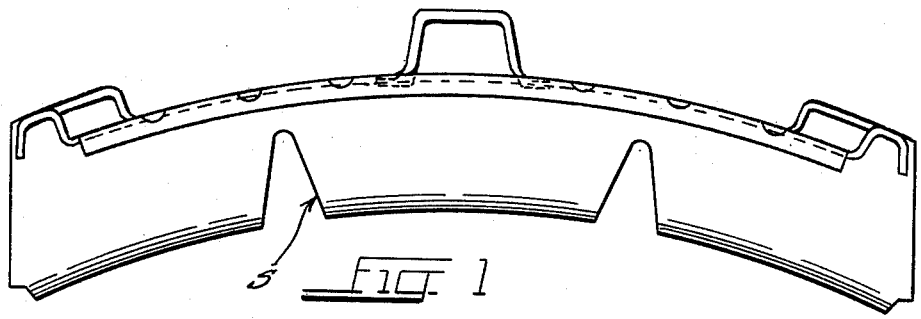
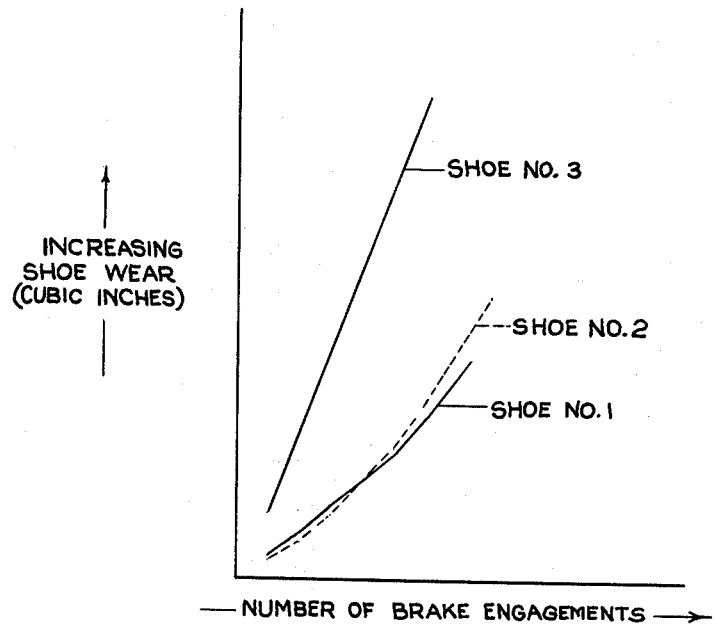
INVENTOR.
RAYMOND E. SPOKES
EMIL C. KELLER
BY
Wallace and Cannon
Att'ys.

3,168,487
FRICTION COMPOSITION OF A RUBBER, CASHEW NUT SHELL RESIN AND LEAD SULPHIDE
Raymond E. Spokes, Ann Arbor, Mich., and Emil C. Keller, Mahwah, N.J., assignors to American Brake Shoe Company, New York, N.Y., a corporation of Delaware
Filed Nov. 20, 1959, Ser. No. 854,512
2 Claims. (Cl. 260—3)

This invention relates to a composition raliroad brake shoe as distinguished from the conventional cast iron railroad brake shoe. This application is a continuation-in-part of application Ser. No. 630,783, filed December 27, 1956, now abandoned.

The conventional brake shoe utilized with railroad equipment has been one of cast iron applied with radial clamping force directly to the tread of the car wheel, but there have been proposals of composition railroad brake shoes consisting of molded or pressed composition material. Such shoes in one form embodied a relatively high proportion of metallic particles together with additional filler such as fibrous asbestos, and these fillers were mixed in a binder matrix of a natural resin or the like. The composition was then shaped into desired form and cured under heat and pressure; and in some instances the composition was pressed into an arcuately configured shell or casing serving as a backing, and finally set to an operative state.

Advantages have been stressed with regard to composition brake shoes of the foregoing kind, but regardless of this, railroad brake shoes of the cast iron type prevail today as the customary, accepted friction element for braking railroad equipment.

Among the disadvantages of composition or filled shoes of the foregoing kind have been variations in wear characteristics and lack of resistance to shock which contributed to relatively poor life of the shoes in service. Moreover, the coefficient of friction of these composition railroad brake shoes under wet conditions does not substantially equal the coefficient of friction under dry conditions, that is, while friction is good so long as the shoe is dry there is an unfavorable low value in those instances where the shoe is wet, this apparently being an inherent defect not encountered with cast iron shoes.

In application Serial No. 491,510, filed March 1, 1955, now Patent No. 2,901,456, there is disclosed a composition railroad brake shoe composed to include an organic binder matrix, filler particles of cast iron, and mineral filler particles in the form of an aluminum silicate selected from the sillimanite group of minerals consisting of naturally occurring, calcined and synthetic forms of the group of minerals consisting of kyanite, sillimanite, andalusite, dumortierite, topaz and mullite, or mixture thereof, each characterized by high hardness, high heat resistance, and high resistance to chemical and physical decomposition at elevated temperatures. The specific organic binder matrix comprises heat-stable rubber, natural or synthetic, and may include a thermosetting resin such as polymerized cashew nut shell liquid.

A particular advantage of the mineral filler of the above specified group is that this filler does not exhibit the characteristic of cast iron to tend toward an overbalance between brake friction and adhesion of the wheel to the rail when braking at high speeds, and yet a mineral of the sillimanite group exhibits substantially the same friction coefficient and substantially balanced wet-dry friction characteristics as particles of cast iron.

The composition railroad brake shoe of the aforesaid patent has proven to be eminently satisfactory in operation. This shoe advantageously includes lead sulphide dispersed as finely divided particles throughout the organic matrix since this improves the friction characteristics of the shoe, and we have now found that the railroad brake shoe of the aforesaid patent can be improved as to wear life and smoothness in action by eliminating from the binder matrix a portion of the lead sulphide particles and binding these together as agglomerated bodies with a rubber-resin binder mixture, and then using the lead sulphide filled rubber-resin bodies themselves as discrete fillers in the main body matrix of the shoe.

As was mentioned above, the organic binder of the present shoe preferably includes a thermosetting resin, and one reason for this is to impart an enhanced degree of thermal stability to the shoe, and moreover, if not compensated, an excessive amount of rubber in the binder may produce unpleasant odors during extended or emergency brake engagement. On the other hand, we have found it to be advantageous to have the shoe as soft as possible in a relative manner of speaking, since it has now been found contrary to expectations that softer shoes wear better and have a milder effect on the tread of the car wheel. Thus, if the amount of resin is excessively high, for example, it is found that the tread of the car wheel becomes scoured, checked and spotty, and the shoe itself wears more rapidly due to the harshness of the hard resin. We have found, however, that by withdrawing a portion of the lead sulphide from the binder as one possible effect on the filler content of the shoe and producing rubber-resin filled bodies therewith in the manner mentioned above, the resin content of the shoe can be increased to an unusually high level for a material of this kind. In other words, the rubber content of the shoe in comparison to resin is desirably decreased without producing a harder shoe, and the manifest advantage of this is that the shoe wears longer under given conditions for some unexplained reason and apparently has a milder effect on the car wheel, and the accomplishment of this advantageous relation is a further object of the present invention.

Previously, the cast iron particles used to fill the shoe have been of white cast iron. We have found that white cast iron particles are responsible for marked lapping or abrading of the car wheel tread, and a further object of the present invention is to overcome this by having resort to cast iron particles of a particular kind that do not exhibit adverse wear characteristics on the car wheel tread.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a side elevation of a typical railroad brake shoe contemplated by the present invention; and FIG. 2 is a graph of comparative wear rates of different shoes.

Under the present invention, a composition railroad brake shoe is afforded having a heat-stable rubber-resin binder in which thermosetting resin predominates over the rubber ingredient, or the equivalent of the rubber ingredient, and containing filler particles including gray cast iron particles, a mineral member of the so-called sillimanite group to be identified more specifically hereinbelow, a degree of dispersed friction modifying particles and asbestos if desired, and essentially, heat-stable rubber-resin bonded bodies containing or filled with lead sulphide particles wherein thermosetting resin again predominates.

Examples 1 and 2 set forth below are, respectively, typical examples of the composition used in molding the shoe, and the bonded lead sulphide agglomerate bodies used in part as a filler material for the shoe:

EXAMPLE 1

| Material: | Parts by weight |
| --- | --- |
| Gray cast iron particles | 20 |
| Kyanite (80–100 mesh) | 13 |
| Bonded lead sulphide bodies (Example 2) | 8.5 |
| Asbestos fibers | 5.8 |
| Lead sulphide [1] | 18.4 |
| Lead (powdered) | 6 |
| Graphite (powdered) | 6.7 |
| Buna S rubber (heat stable rubber)[2] | 5.25 |
| Cashew resin (thermosetting resin) | 11.2 |
| Curing agents | 3.0 |

| [1] Mesh size: | Percent |
| --- | --- |
| +140 | 0 |
| −140, +200 | 3.4 |
| −200, +325 | 7.9 |
| −325 | 88.7 |

[2] Butadiene-styrene copolymer.

EXAMPLE 2

*Bonded lead sulphide bodies (60 mesh)*

| Material: | Parts by weight |
| --- | --- |
| Buna S rubber (heat stable rubber) (see footnote 2 above) | 7.5 |
| Cashew resin (thermosetting resin) | 42.5 |
| Lead sulphide (see footnote 1 above) | 25.2 |
| Graphite (powdered) | 12.5 |
| Curing agents | 13.3 |

In producing a composition railroad shoe in accordance with Examples 1 and 2, the bonded lead sulphide particles may be first produced as follows. The rubber of Example 2 is first broken down in a rubber masticator, sheeted out and dispersed in the usual solvent to produce a cement. Following this, the usual curing agents and the fillers including finely divided graphite and lead sulphide filler are added to the rubber cement. The composition is then sheeted out, dried and baked. This latter operation removes the solvent, vulcanizes the rubber and sets the resin to its infusible, thermoset state. The sheets are then pulverized to approximately sixty mesh resuulting in the desired lead sulphide filler bodies to be used in the shoe.

As to Example 1, the rubber is broken down, the resin is added and blended in a mill with the rubber. A cement is next produced with a solvent in the usual fashion, and the bonded lead sulphide bodies are then added and the material is uniformly mixed. The other fillers including the kyanite, gray cast iron particles (or other iron particles softer than white cast iron and of which malleable iron particles are exemplary), asbestos, lead sulphide, lead, and graphite are then added and mixed, and after uniform dispersion has been obtained the composition is dried to remove the solvent. The resulting composition is then pressed and cured in individual molds in the usual fashion to produce individual railroad shoes as S, FIG. 1, which are later backed.

The rubber and thermosetting resin in the foregoing examples afford the essential heat stable organic binder not only for the matrix of the shoe (Example 1), but also for the bonded lead sulphide bodies of Example 2, and while the particular rubber specified is Buna S, the rubber can be of any desired heat-stable form, natural, synthetic, or reclaim, all being rubber polymers of conjugated diene, or the rubber can be substituted by equivalent thermoplastic materials having substantially the same characteristics in the present environment. Thus, the rubber or equivalent ingredient represents that portion of the shoe which imparts softness thereto as distinguished from the thermosetting resin which is hard and infusible in nature thereby enhancing the heat-stability of the binder. A cashew resin is a soft form of phenolic resin in that the phenolic —OH group is present, but to a lesser percentage weight extent in comparison to a straight phenolic due to the rather long alkyl side chain on the phenolic nucleus which characterizes a cashew resin. We have found that a straight phenol-formaldehyde phenolic resin can be substituted in whole or in part for the cashew phenolic resin provided the rubber content of the binder is increased by an amount to compensate for the increased hardness wrought by the presence of the harder straight phenolic, thereby maintaining a given hardness for given field conditions requiring a particular hardness.

Lead which is dispersed in the binder matrix of the shoe, and graphite as a filler in the binder for the lead sulphide agglomerates, both have the conventional characteristic of desirably modifying the friction of the shoe thus contributing to smooth engagement between the shoe and wheel during braking. These effects are well understood in the art and "friction modifiers" is a common designation for these and other equivalent friction modifiers including iron pyrites and zinc sulphide. The essential contribution of lead sulphide both as individual particles in the binder for the shoe body and in the composite lead sulphide bonded bodies is to inhibit or lessen what is known in the art as a fading tendency for the shoe, that is, for friction to fade out or drop off after prolonged or repeated brake application. Initially, lead, lead sulphide, graphite and the gray cast iron particles are in a relatively finely divided state, approximately 120 mesh. Asbestos is advantageously used to impart tensile strength to the shoe, and is eminently well suited for this purpose because of its fibrous nature and inherent high heat resistance.

By combining the long wearing cast iron particles (Mohs' scale hardness about 6 to 7) with a long wearing mineral filler of the above specified sillimanite group (Mohs' scale hardness about 5 to 8) these two fillers in combination cooperate to attain a good wet-dry friction balance, long wear, heat conduction away from the operating surface of the shoe when the shoe is engaged, resistance to or insulation against incandescence of the cast iron particles, and resistance to an increase in friction at high braking speeds thereby assuring that braking friction does not exceed adhesion of the wheel to the rail. Resistance to incandescence is desirable in order to lessen the tendency toward thermal breakdown of the rubber or equivalent ingredient in the binder, and excessive incandescence can also lead to adverse effects on the tread of the car wheel such as heat checks, undue wear and scouring.

Under the present invention, the cast iron particles where present preferably consist of gray cast iron, since gray cast iron particles have been found to produce appreciably less lapping or abrading of the tread of the car wheel and similar results may be realized by resorting to other irons having a hardness less than white cast iron, such as malleable iron or the like. Experiments have shown that when measured on the radius, the wear on the wheel due to lapping of the wheel by the harder white cast iron is nearly twice that of a softer iron such as gray cast or malleable iron.

The proportions of ingredients used in the shoe in Example 1 are not critical and variations may be made as desired, except that this form of the present invention makes possible resort in the first instance to predominating amounts of resin in the rubber-resin binders of Examples 1 and 2. For instance, the amount of Example 2 agglomerate bodies to be used in the shoe composition of Example 1 may be increased or decreased by at least twenty-five percent, and the percentage of cast iron particles can be decreased with a corresponding increase in mineral particles. The amount of binder in each instance will be selected simply to produce an operative, well-bonded composition.

FIG. 2 is a graph of three curves showing comparative dynamometer wear rates of three different compositions railroad brake shoes. Shoe No. 1 was a shoe corresponding empirically to Example 1 of the present invention. Shoe No. 2 was a shoe corresponding empirically to Example 1 of the present invention except that white cast iron was used instead of gray cast iron. Shoe No. 3 was a shoe similar to shoe No. 2 except that the lead sulphide filler content, which totaled the same as shoes 1 and 2, was entirely of particulated form and included none of the lead sulphide agglomerates. It will be observed from FIG. 2 that the wear rate of shoe No. 3 was vastly in excess of the wear rates of shoes 1 and 2, demonstrating the significant effect of the lead sulphide agglomerates of the present invention. Additionally, use of gray iron improves the life of the shoe, probably due to less spotting, checking and galling of the wheel tread which in turn accounts for a less harsh action of the wheel tread on the shoe. It should be mentioned that these tests were in effect accelerated tests brought about in part by a very large excess of resin over rubber in the binder matrices of the shoes enabling the softening and resistance to wear effect of the lead sulphide agglomerates to be quickly realized and appraised.

Example 1 is practically a percentage ratio, and technical fillers of a nature having no bearing on the present invention may be added to bring the mixture up to one hundred parts or more by weight. Generally speaking, the brake shoe of the present invention exemplified by Example 1 comprises: at least ten percent by weight of soft iron particles and up to 20 percent by weight thereof, and where these particles are under about twenty percent by weight the sillimanite mineral filler is increased accordingly by the difference; at least about ten percent by weight of the sillimanite mineral group filler; about six to about twelve percent by weight of lead sulphide agglomerates; about twenty percent by weight of rubber-resin binder matrix including curing agents; remainder asbestos and friction modifying and enhancing agents including particulated lead sulphide, lead and graphite.

It is to be emphasized in accordance with our discoveries that a composition railroad brake shoe should be as soft as possible without excessive rubber content which would result in unacceptable thermal characteristics, and yet the resin content cannot be so high as to produce undesired wear and thermal effects on the tread of the car wheel and too rapid wear of the shoe itself.

Under the form of the present invention, exemplified by Example 1, this desirable balance or relationship between softness and hardness of the shoe is achieved with relatively high resin contents by having resort to lead sulphide agglomerate bodies, that is, higher than has heretofore been found to be acceptable in actual field use of a composition railroad shoe. Thus, prior to this aspect of the present invention, a desirably soft shoe could apparently be obtained only by increasing the rubber content, but this resulted in what might be deemed objectionable odor caused by thermal disintegration of the rubber in the shoe during application of the shoe to the car wheel. As will be apparent from Example 1, the resin content of the binder matrix is practically twice that of the rubber content, and in Example 2 the resin content is nearly six times that of the rubber content. Based on our prior knowledge and experience in this art, such resin to rubber ratio would be at first glance considered as representing an unacceptably hard shoe, but we have found that by filling the shoe with what may be termed rubber-resin bonded bodies of agglomerated lead sulphide the shoe, for some reason or other, is softer than prior composition railroad shoes of this general order wherein the rubber ingredient in the binder predominates over the resin ingredient.

As was mentioned above, we are not altogether certain as to why elimination of a portion of the finely divided lead sulphide from dispersed state in the binder matrix of the shoe and used to produce composite, agglomerated lead sulphide bodies in accordance with Example 1 should account for the ability to use a high resin content for the binders in the shoe without producing an undue hardening effect. From a friction element standpoint, lead sulphide substantially reduces the fading tendency for the shoe as was mentioned above, and consequently its incorporation contributes to optimum performance. The distinct advantages attained under this form of the present invention by use of composite bodies of lead sulphide agglomerated or bound together with a rubber-resin binder may possibly be accounted for as an incident to some inherent concentrated hardening effect of the lead sulphide on the rubber ingredient used to bind the lead sulphide particles together, thereby uniquely enhancing the overall wear resistance of the shoe without imparting the marked harshness of thermosetting phenolic resins as represented by the cashew resins. Further in this connection, lead sulphide possesses innate high heat resistance which might possibly have an advantageous effect on the rubber binder ingredient for the composite lead sulphide bodies, and it may be this concentrated thermal characteristic of lead sulphide that accounts for the improved characteristic of the shoe as a whole from the standpoint of improved wear of the shoe and improved action of the shoe on the tread of the car wheel.

In other words, when characterizing the present railroad composition brake shoe represented by Example 1 as being "soft" yet having a high resin content, we are speaking comparatively of what we know from our investigations to be the tendency of prior shoes of this kind with a high rubber content to wear better and to have a milder effect on the car wheel in comparison to prior shoes wherein the major constituent of the binder was resin and therefore considered "hard." In any event, the frictional advantages of lead sulphide are advantageous, and for some reason or other concentration of a portion of the lead sulphide in composite bodies of the aforesaid kind using rubber and resin as a binder for the bodies, with resin preferably predominating, produces the improvements mentioned, and yet the contribution of lead sulphide to the friction characteristics of the shoe as a whole is in no way lessened.

Hence, while we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A composition brake shoe comprising a shoe body composed of a binder matrix comprising essentially a rubbery polymer of conjugated diene and cashew thermosetting resin and in which the resin predominates proportionally over rubber, and said shoe body including dispersed throughout the binder matrix thereof individual filler bodies composed of finely divided particles of lead sulphide bonded together and agglomerated by a binder of a rubbery polymer of conjugated diene and thermosetting cashew resin and in which the resin predominates proportionally over rubber, before said filler bodies are dispersed throughout the binder matrix, said filler bodies being present in an amount of about six to twelve percent by weight of the shoe.

2. A composition brake shoe comprising a shoe body composed of a binder matrix comprising essentially a rubbery polymer of conjugated diene and thermosetting cashew resin wherein said resin is present in an amount of more than fifty percent by weight of the rubber-resin binder matrix, said shoe body having pre-formed individual filler bodies uniformly dispersed throughout the binder matrix and each such filler body being composed of particles of finely divided lead sulphide in which the lead sulphide particles are bonded together and agglomerated into said individual filler bodies by a binder composed both of a rubbery polymer of conjugated diene and thermosetting cashew resin before said filler bodies are uniformly dispersed throughout said matrix, said rubber-resin binder for said filler bodies having a thermosetting cashew resin content of more than fifty percent by weight, said filler bodies being present in an amount of about six to twelve percent by weight of the shoe, and said shoe body having additional filler material uniformly dispersed throughout said binder matrix and including particulated cast iron and a particulated mineral of the sillimanite group.

References Cited in the file of this patent

UNITED STATES PATENTS

| | | |
|---|---|---|
| 2,052,779 | Lidkea et al. | Sept. 1, 1936 |
| 2,686,140 | De Gaugue | Aug. 10, 1954 |
| 2,784,105 | Stedman et al. | Mar. 5, 1957 |
| 2,901,456 | Spokes et al. | Aug. 25, 1959 |